E. E. LAWRENCE.
CAKE CUTTING MACHINE.
APPLICATION FILED SEPT. 23, 1909.
1,052,597.
Patented Feb. 11, 1913.
5 SHEETS—SHEET 2.
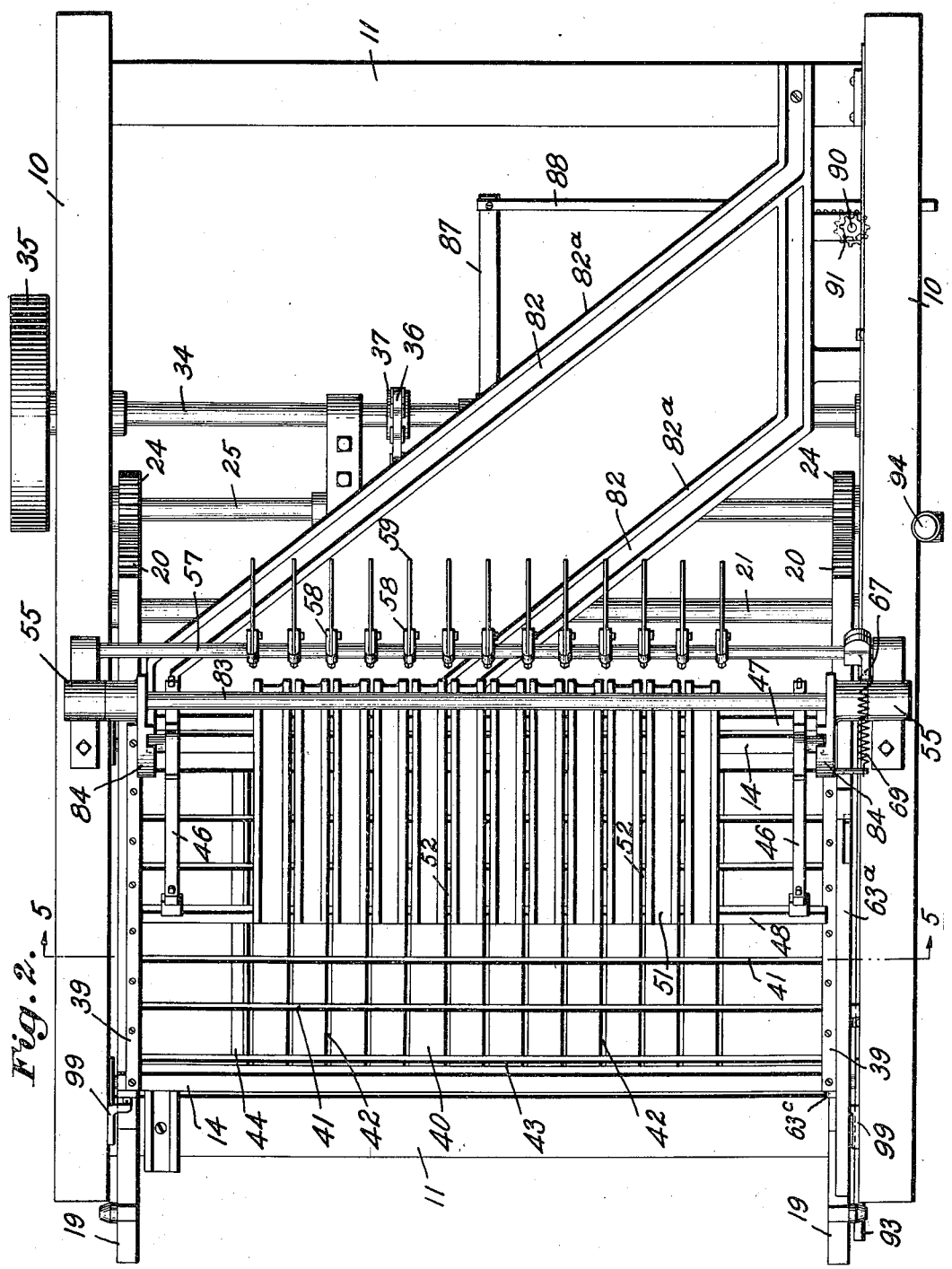
Witnesses
Ernest A. Telfer
Carl L. Choate
Inventor:
Edward E. Lawrence
by Emery & Booth
Att'ys.

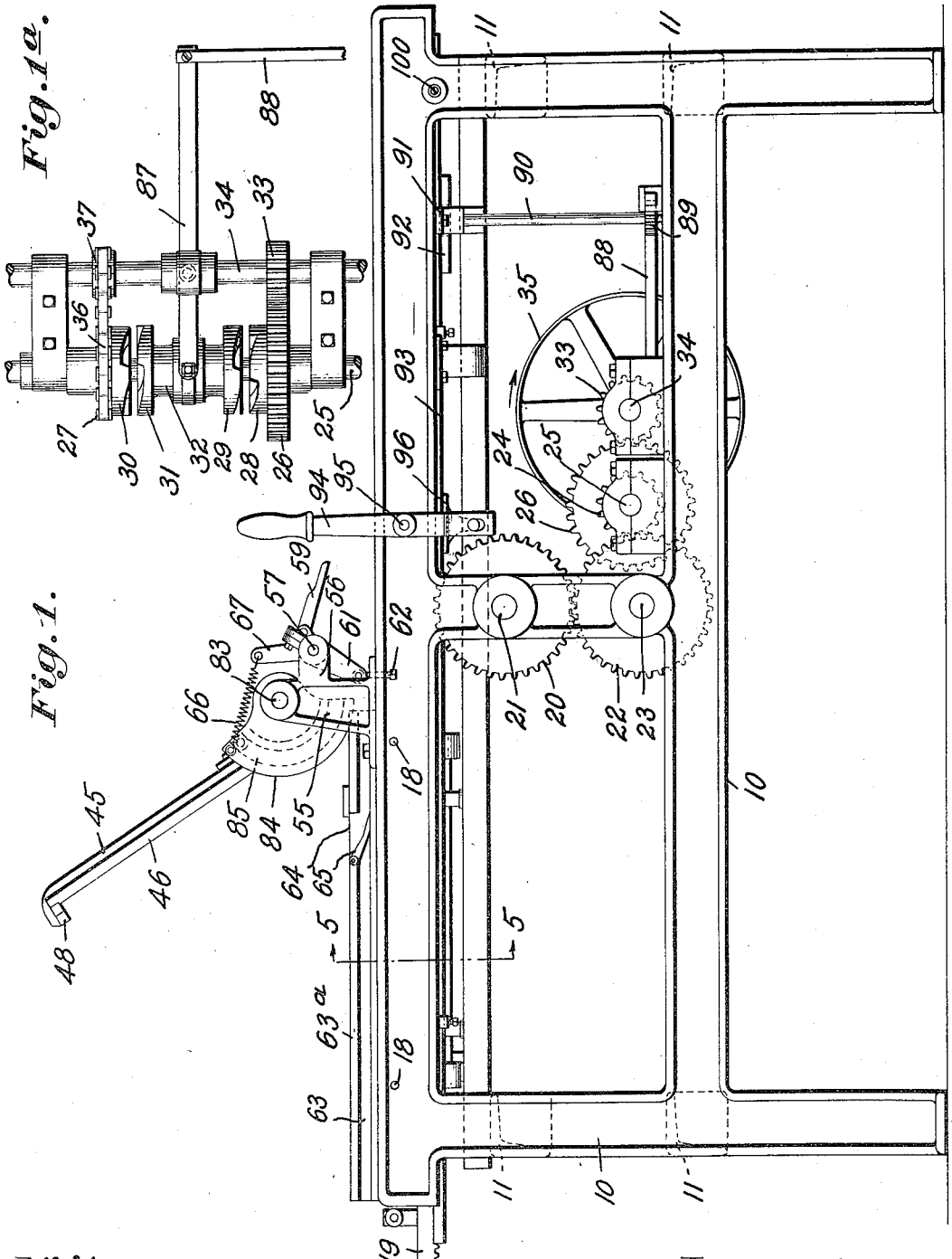
E. E. LAWRENCE.
CAKE CUTTING MACHINE.
APPLICATION FILED SEPT. 23, 1909.
1,052,597.
Patented Feb. 11, 1913.
5 SHEETS—SHEET 1.
Witnesses:
Ernest A. Telfer
Carl L. Choate.
Inventor:
Edward E. Lawrence
by Emery & Booth
Attys.

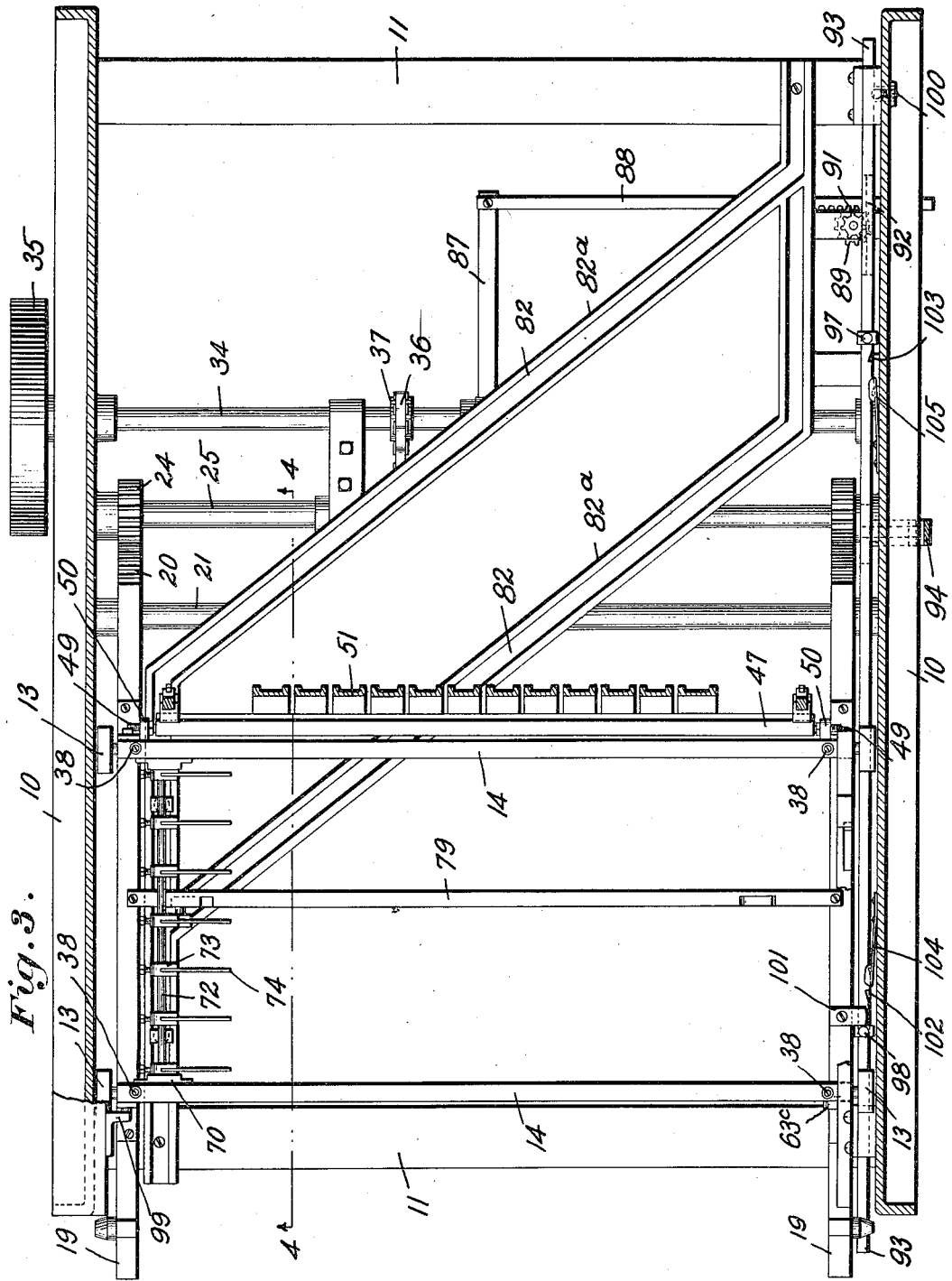

E. E. LAWRENCE.
CAKE CUTTING MACHINE.
APPLICATION FILED SEPT. 23, 1909.
1,052,597.
Patented Feb. 11, 1913.
5 SHEETS—SHEET 4.
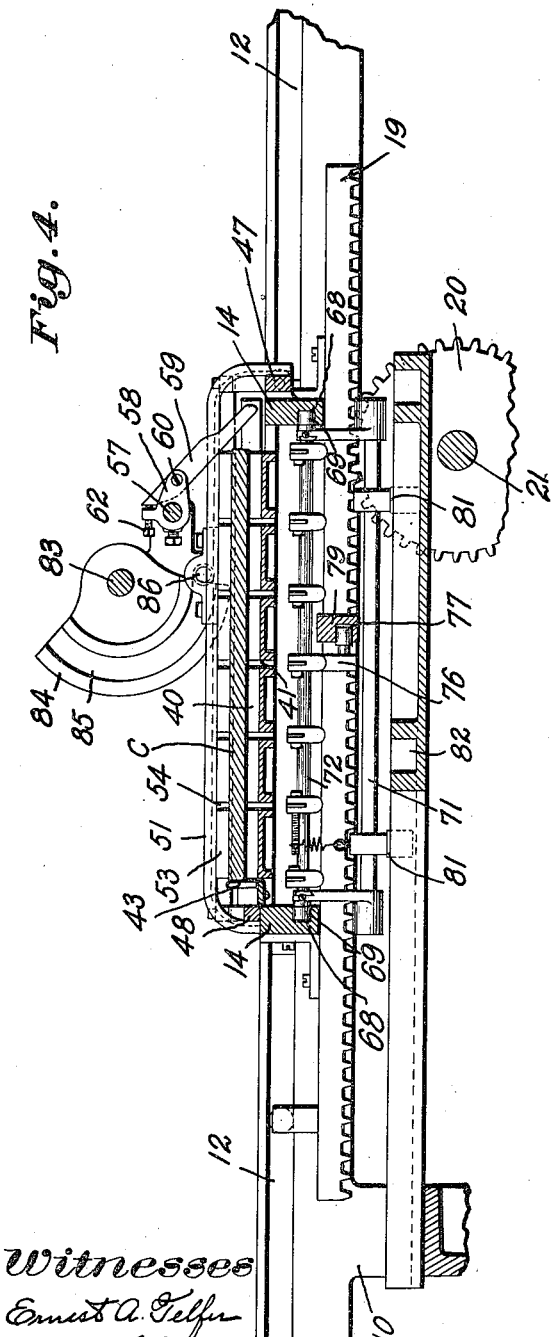
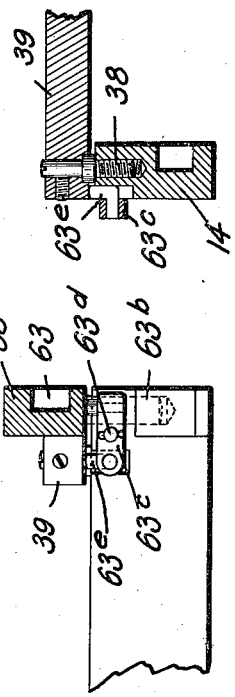
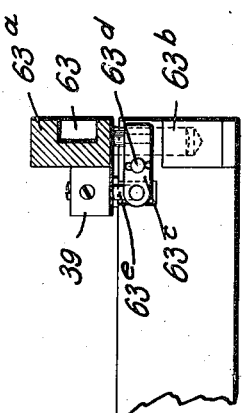
Witnesses
Ernest A. Telfer
Carl L. Choate
Inventor:
Edward E. Lawrence
by Emery & Booth
Att'ys.

E. E. LAWRENCE.
CAKE CUTTING MACHINE.
APPLICATION FILED SEPT. 23, 1909.

1,052,597.

Patented Feb. 11, 1913.

5 SHEETS—SHEET 5.

Witnesses:
Ernest A. Telfer
Carl L. Choate

Inventor:
Edward E. Lawrence
by Emery & Booth
att'ys.

UNITED STATES PATENT OFFICE.

EDWARD E. LAWRENCE, OF CAMBRIDGE, MASSACHUSETTS, ASSIGNOR TO LOOSE-WILES BISCUIT COMPANY, OF KANSAS CITY, MISSOURI, A CORPORATION OF MISSOURI.

CAKE-CUTTING MACHINE.

1,052,597.  Specification of Letters Patent.  Patented Feb. 11, 1913.

Application filed September 23, 1909. Serial No. 519,277.

*To all whom it may concern:*

Be it known that I, EDWARD E. LAWRENCE, a citizen of the United States, and a resident of Cambridge, in the county of Middlesex and Commonwealth of Massachusetts, have invented an Improvement in Cake-Cutting Machines, of which the following description, in connection with the accompanying drawings, is a specification, like letters on the drawings representing like parts.

My invention relates to and aims to improve machines for cutting cake, in the manufacture of the latter in large quantities for commercial sale.

While not necessarily restricted thereto, my invention is, nevertheless, especially adapted for cutting sheets of cake after said sheets have been baked in the ovens, and this whether the cake is plain goods, or combination, or sandwich goods.

My invention will best be understood from a description of one embodiment thereof which I have selected for disclosure of my invention, and which is shown in the accompanying drawings.

Figure 5:
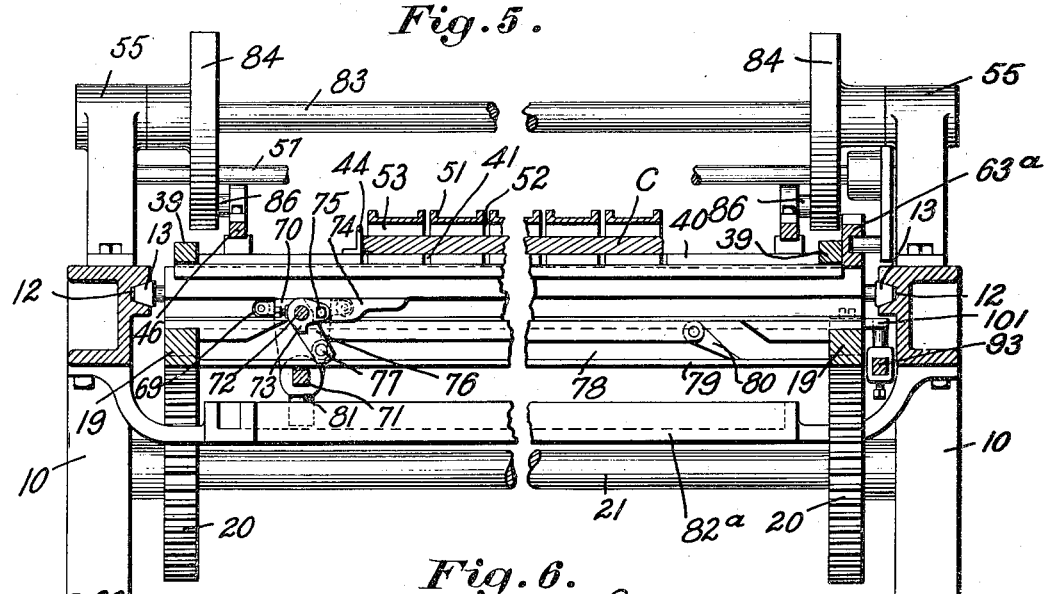
Figure 6:
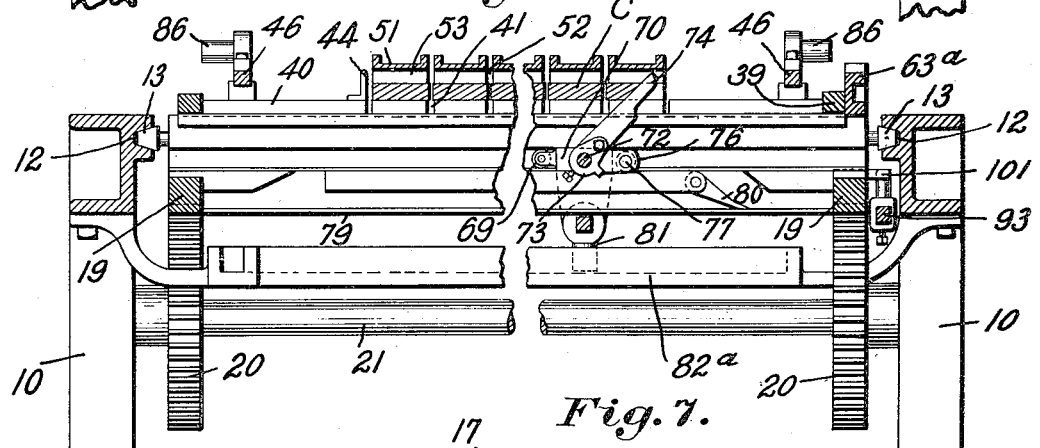

Referring to said drawings: Figure 1 is a side elevation of a machine illustrating said embodiment of my invention, with the presser elevated in readiness to receive a sheet of cake to be cut in and by the machine; Fig. 1ª is a detail in plan view, showing one form of driving and reversing mechanism; Fig. 2 is a plan view of the machine, Fig. 1; Fig. 3 is a somewhat similar view to Fig. 2, with the cake bed removed to expose the under cutters, and with parts of the side frames broken away; Fig. 4 is a longitudinal sectional detail on the dotted line 4—4, Fig. 3, looking in the direction of the arrows on said section line; Fig. 5 is a transverse section, on an enlarged scale, on the dotted line 5—5, Figs. 1 and 2, said view being broken away through the middle, to enable it to be placed upon the sheet, said view also showing the under cutters in their depressed or inactive positions; Fig. 6 is a view along the same section line, but during the return movement of the carriage, and showing the under cutters in their elevated or active positions; and Figs. 7, 8, 9 and 10, details to be referred to.

Referring to the drawings in the particular illustrative embodiment of my invention there shown, said machine comprises two transversely of the machine by end frame members 11, said side and end members being connected or secured together in any suitable manner. The side frames 10, at their inner faces and along their upper edges, are provided respectively with the longitudinal guide-ways 12, see Figs. 4 to 6, preferably made flaring in cross section to receive the correspondingly shaped shoes 13, four in number and mounted, respectively, at or near the four corners of a horizontal reciprocatory carriage 14, adapted to be reciprocated lengthwise the machine. These shoes 13 are connected in a swivel manner with the said carriage, to permit them always to adjust themselves to the alinement of their respective guide-ways without interfering with the running of the carriage.

Figure 7:
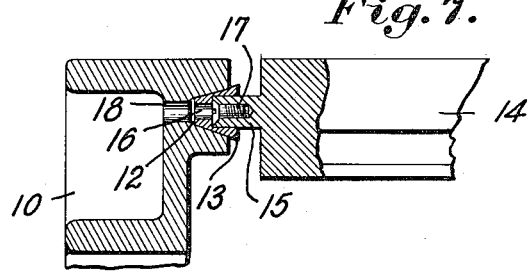
Figure 8:
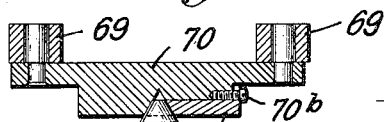

Referring to the sectional detail shown in Fig. 7, each shoe is provided with a central circular recess, which receives the journal 15 projecting laterally from the carriage. The shoe, opposite the axis of said journal, is provided with an access opening 16, which overlies the larger head of an adjusting screw 17 tapped into the end of the journal, the fit of the threads being such that said screw will retain its adjusted position without additional locking means. When, in the use of the machine, said shoes, or any of them, wear loosely in their respective guide-ways, the operative, by inserting the end of a screwdriver through an opening in the side frame provided for the purpose and shown at 18 (Fig. 7), and also through the access opening 16 in the shoe, may slack up on the screw 17 and thereby cause the screw head to force the shoe outward, to take up the wear to any necessary extent. Depending from and secured to the opposite sides of the carriage 14 are racks 19 (see Fig. 5) driven, respectively, by wheels 20, fast on the transverse shaft 21, journaled in the frame. Referring now to Fig. 1, said rack wheels 20 below said shaft 21 are driven by gear wheels 22, loosely mounted upon studs 23, projecting inwardly from the side frames and in turn driven by pinions 24 fast on a transverse shaft 25, journaled in said side frames. Referring now to the detail in Fig. 1ª, the shaft 25, which carries at its ends said pinions 24, has mounted upon it intermediate its ends the spur gear 26, and the sprocket gear 27, both loose upon said shaft and proclutch members 28 and 30. Between these clutch members are coöperating clutch members 29 and 31, formed, respectively, upon opposite ends of a sleeve 32, splined upon said shaft 25 and adapted to be moved in one or the opposite direction to clutch one or the other of said wheels 26, 27 to said shaft, to impart rotation thereto. The spur gear 26 (see Fig. 1ª) is in mesh with and driven by a pinion 33, fast on a main shaft 34, journaled in the frame and provided at one end with a driving pulley 35 (Fig. 1) to receive a driving belt or to be driven in any other desired manner. The sprocket wheel 27 is connected by a sprocket chain 36 with a sprocket pinion 37, also fast on said main shaft 34. Rotation of the main shaft 34 in the direction of the arrow thereon (Figs. 1 and 1ª) will thus cause opposite rotation of the gear and sprocket wheels 26 and 27, consequently, as the pinion shaft 25 is clutched to one or the other of said gears it will be rotated in one or the opposite direction, and through the gears and racks described will cause the carriage 14 to be reciprocated, first in one and then in the opposite direction of the length of the machine. The spur and sprocket gear connections between the main and pinion shafts described are so proportioned as to cause the same rate of travel of the carriage in its opposite directions.

Referring now to Fig. 3, the carriage 14 at or near its four corners is shown as tapped to receive the collar screws 38 (see Fig. 9), the collars whereof support (see Fig. 2) the side members 39 of the removable cake bed of the machine. The side members 39 of the bed are connected across the machine by a series of transverse bed members 40 of any desired width and number, and arranged so as to leave cutting spaces between them marked 41 on the drawing. The transverse bed members 40 are not only separated one from another to leave the transverse cutting spaces 41, but they are scored or provided with cross cut grooves 42 to be hereinafter referred to. The sheet of cake or material C to be cut is placed upon this bed as shown in Fig. 4 and of course is reciprocated with the bed and the carriage upon which it is mounted. To facilitate accurate positioning of the material upon the bed, I have provided at the left (Fig. 2) an edge gage 43, against which the material may be placed and, if desired, an end gage 44 may also be employed to assist in positioning the material. To confine the material in position upon and during the reciprocations of the bed, I have provided a presser 45, shown best in Fig. 1. This presser (see Figs. 1, 2 and 4) comprises a pair of side arms 46 (Fig. 2) connected across the machine at their opposite ends by the cross members 47, 48, said cross members being considerably below the side members of the presser frame, as indicated.

The right hand cross member 47 (Figs. 3 and 4) is pivotally supported between two pivot screws 49 (see Fig. 3), held with lock nuts in ears 50 on the adjacent transverse member of the reciprocatory carriage, whereby said presser frame is reciprocated bodily with said carriage and at the same time has an up and down swinging movement on and relative to the carriage, and to and from the cake bed thereon. The cross members 47, 48 of said presser frame are connected by a plurality of longitudinally arranged channel bars 51, shown best in Fig. 2, arched between their ends as best shown in Fig. 4, so that they may be secured by and at their ends to said presser cross members 47, 48, yet intermediate their ends rise to a level somewhat above the side members of the presser frame. These channel members in width and number should, for the best results, correspond with the spacings between the scorings 42 (see Fig. 2) on the transverse members 40 of the cake bed, said channel bars being spaced one from another by spaces 52 substantially corresponding in width to the width of said scorings 42. To the under sides of said channel members 51 (see Fig. 4) are suitably secured the spaced presser blocks 53 of a width equal to the widths of the channel members of the presser, and of lengths corresponding to the widths of the transverse members 40 of the cake bed, they being separated end to end by transverse spaces 54 (best shown in Fig. 4). Thus there is provided a cake bed having transverse slots 41 extending completely through it from top to bottom, and longitudinal scorings 42 extending but partially through said members from their upper faces, and there is also provided above this cake bed a presser, which presents longitudinal slots 52 extending completely through it from top to bottom, and transverse scorings or grooves 54 extending but partially through from the under side thereof upward. Thus it is possible, as the carriage reciprocates in one direction—as for instance to the right— with a sheet of material held firmly between the presser and the bed, to drop a series of cutters or knives through the longitudinal slots 52 in the presser and into the longitudinal scorings 42 in the bed, to slit the sheet of cake material into a series of longitudinal strips, or parallelograms, and, upon the return movement of said carriage (to the left, Fig. 4), to elevate a series of transverse cutters through the transverse slots 41 in the cake bed to and into the transverse scorings 54 in the presser, and cut these longitudinal strips or parallelograms transversely into a larger number of smaller cakes or parallelograms, all without releasing the cake material at any time from the firm holding pressure between the presser and the bed. I will now describe the arrangement and operation of these longitudinally and transversely acting cutters.

Referring now to Figs. 1 and 4, erected upon the side frames 10 are standards 55, provided with laterally extended ears 56, in which is journaled a transverse upper cutter shaft 57. This shaft has secured upon it, at properly spaced intervals, a series of cutter holders 58 (Fig. 4), adjustable longitudinally of the shaft and slotted at their outer ends to receive between them the upper cutter knives 59, pivotally secured to and in said holders by pivot screws 60. These knives are of such length that when in their lowermost positions (Fig. 4) they will reach down through the longitudinal slots 52 in the presser, through the cake sheet beneath the same, and into the longitudinal scorings (Fig. 2) of the bed members; and when elevated into their positions (Fig. 1) will be entirely above and clear of the said presser. These knives preferably stand in their operative positions at an angle of approximately 45°, and to adjust said angle and also to adjust the level of the lower ends of said cutters, I have herein extended the upper ends of the knives above their pivots 60, to be acted upon by the adjustable set screws 62, by means of which any desired adjustment of said knives may be had.

Referring now to Fig. 1, the cutter shaft 57 at one end thereof is provided with a depending arm 61, carrying a roller stud which normally rests upon a suitable support, preferably in the form of an adjustable stud or screw 62, on one of the side frames. The carriage is provided at its side and slightly above the top of the side frame with a straight longitudinal cam bar 63$^a$, having its outer face formed to present a cam-way or groove 63, the upper wall of which near the leading end of the carriage is interrupted at 64 and controlled by a swinging tongue 65, which normally rests by gravity upon the lower wall of the cam groove. As the carriage travels to the right (Fig. 1) the roller stud at the lower end of the depending arm 61 enters said groove 63, and, meeting the inclined tongue 65, is diverted upward to the top of the upper wall of the cam groove, along which it rides during the balance of the said movement of the carriage. This causes the upper knives 59 to be swung downward into their positions (Fig. 4) to drag through the presser slots and bed scorings and cut the sheet of material held between the presser and bed upon the carriage into the series of longitudinal strips referred to. Just before the carriage reaches the limit of its movement to the right (Fig. 1), the wall of the cam groove 63 passes from under the arm roller and permits the latter to drop again upon its support 62, thereby elevating the knives clear of the presser, so that upon the return movement of the carriage (to the left in Fig. 1) the said roller stud will enter and travel along in the groove 63, lifting the tongue 65 as it meets the same, and continuing until the parts again assume the positions shown in Fig. 1. To assist in returning the cutters to their normal positions at the end of the travel of the carriage to the right (Fig. 1), I have provided a spring 66 (Fig. 1), connected to an arm 67 rising from one end of the cutter shaft 57.

The under cutters are arranged as follows, referring to Figs. 4, 5 and 6: First, turning to Fig. 4, the transverse members 14 of the carriage are shown provided at their inner adjacent faces with horizontal tracks 68, which receive, respectively, pairs of rollers 69 on the opposite ends of the upper edges of two shoes 70 (shown best in Figs. 5 and 6). These shoes depend considerably below the carriage and are connected longitudinally of the machine by the square bar 71. Loosely journaled in the shoes 70, preferably at a level about opposite the tracks 68, is the longitudinally arranged cutter bar 27. This cutter bar (see Fig. 8) has its conical ends pivotally received in conical recesses in the said shoes 70, said recesses being adjustable, to take up wear, by means of bearing plates 70$^a$ controlled by adjusting screws 70$^b$. Mounted upon and adjustable along this under cutter bar 72 are the holders 73 for the under cutter knives 74, normally in their horizontal positions shown in Fig. 5. Said under cutter knives, however, are pivotally mounted at 75 in their respective holders, and are adapted to be elevated into inclined positions (as best shown in Fig. 6), in which positions they will rise through the transverse slots 41, between the transverse bed members 40, and into the transverse scorings 54 in the longitudinal members of the presser. The under cutter shaft 72 (see Fig. 5) is provided, intermediate its length, with a depending arm 76 (see Figs. 4 and 5), provided with a laterally extended roller stud 77 adapted to travel in the cam groove 78 of a transverse cam bar 79, secured at its ends to the side frames of the carriage 14. The shoes 70 and square connecting bar 71 referred to constitute, in effect, a cross-head for the series of under cutters, which cross-head has a travel across the carriage from one to the opposite side thereof while said carriage is itself traveling lengthwise of the machine. As the said cross-head travels across the machine to the right (Fig. 5) and toward the front (Fig. 1), said roller stud 77 travels idly along in the cam groove 78, past the hinged tongue 80, which it lifts, until it reaches the limit of its travel to the right in said figure at about the time the carriage completes its travel to the right (Fig. 1). On the return movement of said under cutter cross-head across the machine, and after the longitudinally acting upper cutters have finished their work, said roller stud 77 will travel up the inclined tongue 80 to the top of the upper wall of said cam groove 78, and will thereby elevate the series of under cutters 74 into the positions (Fig. 6) so that during the return movement across the machine said cutters will act in and through the transverse slots 41 between the bed members, and in the transverse scorings 54 in the presser overlying the same. To effect this transverse travel of the under cutter cross-head by and during the longitudinal travel of the main carriage, I have provided the square connecting bar 71 (see Fig. 4) with depending roller studs 81, which enter the obliquely arranged cam grooves 82 in the stationary cam frame 82ª, fast in the frame of the machine.

As the carriage reciprocates to the right (Figs. 1 and 3) the roller studs 81, moving in the oblique cam grooves 82, will cause the under cutter cross-head, with its series of depressed under cutters, to travel simultaneously across the machine to the front thereof (Fig. 1), and thus said under cutters are brought inactively to the front side of the machine during the travel of the carriage to the right, while the upper cutters are performing their work to longitudinally slit the material. Return movement of the carriage operates as described to elevate the upper cutters so that they will rise clear of the slots in the presser, and, at the same time, the oblique cam grooves 82 will cause a return movement of the under cutters across the machine, toward the back side thereof, and, as they are so returned, the tongue 80 (Fig. 5) will cause them to be elevated, to transversely cut the longitudinal strips produced during the outward travel of the carriage. Thus the sheet of material is cut longitudinally during the outward movement of the carriage, and transversely during the return movement thereof, and the two series of cutters are each so controlled by their respective cams as to be respectively out of operative position while the other series is performing its work, and there can be no possible conflict between the two series. The sheet of cake material is firmly held between the presser and the bed during both the longitudinal and the transverse cutting, and close to the respective lines of cut, so as to prevent any damage to the cake material due to improper clamping or holding thereof. By reason of the fact that the sheet of material is held uniformly pressed downward upon the bed throughout its entire area, it is possible successfully to cut what is known as "sandwich" or other similar or equivalent materials without danger of squeezing the between layers outward at the edges of the sheet, nor is there any diminution in thickness of the material at one part as compared with another, as has heretofore been the case when attempting to cut such materials by hand, and with the use of a ruler and guide.

The presser is automatically depressed and elevated by the machine, and by mechanism which I will now describe.

Referring to Figs. 1 and 4, the standards 55, rising from the side frames and heretofore referred to, carry at their upper extremities a transversely arranged shaft 83, upon which just inside the said standards are fixedly secured the cam segments 84, provided with segmental cam grooves 85 which receive roller studs 86 on the side arms 45 of the swinging presser. The said presser being hinged upon the carriage, when the carriage is in its normal position (at the left in Fig. 1) said roller studs 86 are necessarily in the upper ends of the segmental cam grooves 85, holding the said presser in elevated position. After a sheet of cake material has been placed upon the bed and the machine set in motion, the first part of the travel of the carriage (to the right, Fig. 1) will cause the roller studs 86 to be dragged downward in and along the segmental cam grooves 85, to depress the presser upon and to hold the material upon the bed. As the carriage continues its travel to the right the roller studs 86 on the depressed presser 45 will leave the lower open ends of the segmental cam grooves 85, and, during the balance of the travel to the right, said presser will remain depressed by its own weight only, although means may be provided positively or otherwise to hold the said presser depressed, if desired. On the return movement of the carriage to the left, and after the cutters have completed their work, said roller studs 86 will, just before the close of said movement, reënter the lower ends of the segmental grooves 85, and during the final movement of the carriage said grooves will cause the presser to be again elevated to its position, Fig. 1. Thus, when the machine has completed its cycle, the presser is elevated to permit the cut cakes to be peeled or otherwise removed, and, after a new sheet has been placed in position, it is automatically clamped before the cutting begins.

When the machine is at rest the sliding clutch member 32 (see Fig. 1ª) is in midposition, free of engagement with either of the oppositely rotating clutch members 28 and 30. This clutch sleeve is moved in either direction by means of a fulcrum arm 87, the outer end of which is connected to one end of a transversely movable rack bar 88 (see Fig. 3), engaged by a pinion 89 on the upper end of a vertical shaft 90 (see Fig. 1) journaled in suitable bearings on the frame. At its upper end said vertical shaft is provided with a second pinion 91 (shown in dotted lines, Fig. 1, and also in Fig. 3), which meshes with a short rack 92 in one side of the longitudinally arranged shipper bar 93, mounted in suitable bearings on the side frame. This shipper bar may be reciprocated manually (see Fig. 1) by a shipper lever 94, fulcrumed at 95 on the frame and at its lower end engaging a bracket 96, depending from said shipper bar 93. To start the machine the operative throws the shipper handle to the right (Fig. 1), in the direction in which the carriage is to travel, and thereby throws the shipper bar 93 to the left, in the opposite direction to that in which the carriage will travel, and, through the connections described, slides the clutch sleeve 32 into engagement with the clutch member 28, to cause the machine to start and move the carriage to the right for the longitudinal cuts. As the carriage approaches the limit of its travel to the right (Figs. 1 and 3) it, or a lug 101 thereon, strikes a tappet 97 on the shipper bar 93, and pushes the said bar before it to disengage the clutch sleeve 32 from the outgoing clutch driving member 28, and into engagement with the reversely rotating return clutch member 30, which causes the carriage to start upon its return travel. As the carriage approaches the limit of its return travel it strikes another tappet 98, also on said shipper bar 93, and moves the latter back again to its original position before it was moved by the shipper handle 94, and far enough to disengage the clutch sleeve 32 from the return driving clutch 30, but not far enough to reëngage it with the forward moving clutch drive member 28. Thus, the machine is brought to rest at the completion of its cycle of movement. After the returning carriage has disengaged the clutch sleeve 32, as described, from the return clutch driver 30, to prevent the momentum of the returning carriage from moving the shipper bar 93 to its full distance, which would cause another forward movement and complete cycle of the machine, I have provided a stop for the said carriage, shown at 99 (Fig. 3). This stop is positioned to arrest the carriage when it has disengaged the returning clutch and before it can have thrown in the forward clutch. To further guard against repeated movements of the machine I have provided the shipper bar 93 (see Fig. 3) with a centering depression, acted upon by a spring pressed stud 100, which tends to center the bar and hold it in mid-position with the clutch mechanism entirely disengaged.

insure always a complete cycle of movements, otherwise there might be danger of conflict between the longitudinally and transversely acting knives. To accomplish this I have provided the shipper bar 93 at its outer side face, and near its opposite ends, with oppositely facing notches 102, 103, with which respectively coöperate the yieldingly supported catches 104, 105. When the said shipper bar has been moved to the left (Fig. 3) to start the machine, its notch 103 will be engaged by the catch 105 and said bar thereby locked against any further movement until the carriage has reached the end of its outward travel to the right (Fig. 1) when, just before it engages the tappet 97 to reverse the drive, said carriage acts upon and throws out the catch 105, thereby releasing the shipper bar, to permit it to be driven ahead by further movement of the carriage, to reverse the drive. The shipper bar in its new position is caught by engagement by the other catch 104 with its coöperating notch 102, which locks it in its new position until completion of the return movement, when the catch is similarly released as the machine comes to rest. Thus, when once the machine has started upon its cycle of movements it must finish such cycle before it can be stopped by any movement of the shipper lever.

To accommodate sheets of cake or material of different thicknesses, instead of adjusting the presser relative to the bed 39 I prefer to adjust the level of said bed. Referring to Fig. 9, this is readily accomplished by adjustment of the collar screws 38 which support the said bed, set screws or other means being provided to lock said collar screws against movement from adjusted positions. When the bed is lowered to accommodate a thicker sheet of cake material, it is clear that the upper cutters 59 should be adjusted to reach also to a lower level, in order that their ends may still travel in the longitudinal scores in the bed member. To accomplish this automatically, I have herein made the cam-way or groove bar 63ᵃ vertically adjustable, and have provided the same (see Figs. 1 and 10) with depending guide dowels 63ᵇ, which are received in suitable recesses in the adjacent side frame of the carriage, said dowels serving to preserve the proper alinement of the said cam-bar in its various adjusted positions. Between the said guide dowels 63ᵇ the machine frame (see Fig. 10) is provided with a short lever 63ᶜ, fulcrumed at 63ᵈ, one end of said lever having a portion which rests in contact with the under side of said cam-bar 63ᵃ, the other end of said lever having a finger 63ᵉ which rests in contact with the under side of the bed 39 (see Fig. 9). When the said bed is lowered as described, to accommodate a the inner end of said lever 63ᶜ and, by elevating the opposite end thereof, causes the cam-bar 63ᵃ to be elevated sufficiently to cause the necessary added depression of the upper cutters to effect travel of their free ends in the longitudinal scorings of the bed in its lowered position. If said bed be elevated, to accommodate a thinner sheet of cake material, the weight of the cam-bar 63ᵃ will cause it to drop to an extent permitted by the elevation of the bed, thereby to cause the lower ends of the upper cutters to stand at a higher level still to operate in the longitudinal scores of the bed. Thus, adjustment of the bed automatically effects corresponding adjustment of the upper cutters, so that the ends of the latter will always properly travel in the scorings in the bed.

In designing the machine, I prefer that the greatest lengths of the completed or cut cake shall lie longitudinally of the machine, in order that the smallest number of cuts shall be formed by the transversely operating cutters which, because of the mechanism for operating the same, should be as few in number as possible.

While I have found cutters made in the form of knives, positioned obliquely as herein, to be effective and preferable for most kinds of work, my invention obviously is not restricted thereto but comprehends the use of any means capable of making an incision or cut in, or separation of, the material, and however it may act upon the material, and the term "cutter" as used in the claims is intended to be generic to any such separating, incising or cutting means; so, also, the number of cutters, or sets of cutters, or the lines along which they shall act, may be varied according to the desired product.

While I have designated my invention as applicable to the cutting of cakes from baked material, yet my invention is not restricted thereto, and the term "cake cutting machine" as used in the claims may be considered as generic to any material susceptible of being handled or cut in accordance with my invention.

Claims:

1. A cake cutting machine comprising in combination opposed holding members for the material to be cut, one or more cutters operating through one of said members and entering the other, and means to effect relative cutting movement between said cutter or cutters and said members in one direction while moving said holding members in a different direction.

2. A cake cutting machine comprising in combination opposed holding members, a plurality of cutters, one operating through each of said members and entering the other, and means to impart traveling movement to said holding members during the periods of operation of said cutters.

3. A cake cutting machine comprising in combination opposed holding members, a cutter or series of cutters operating through each of said members and entering the other member, and means to reciprocate said holding members together and first in one and then in an opposite direction during the periods of operation of said respective cutters or series of cutters.

4. A cake cutting machine comprising in combination a reciprocable bed and its presser constituting holding members for the material to be cut, each slotted and scored, a series of non-traveling cutters arranged to operate through the slots of one of said members and in the scores of another during and by reason of the travel of said holding members in one direction, and a second series of cutters mounted to travel with said bed in one direction and means to move them in and through the slots of the second of said members and in the scores of the first during their said traveling movement.

5. A cake cutting machine comprising in combination a reciprocable bed, its presser reciprocable therewith, a series of cutters arranged above said presser and adapted to operate in slots therein and in grooves in the said bed as the said bed and presser reciprocate in one direction, and a second series of cutters arranged below said bed and to reciprocate therewith and means to move them transversely of and in slots in said bed and in grooves in the said presser during opposite reciprocation of said bed.

6. A cake cutting machine comprising in combination reciprocable holding means for the material to be cut, means to reciprocate said holding means in opposite directions along a single path only, and cutting means operating along intersecting lines to cut the material in different directions during opposite reciprocations of said means along said path.

7. A cake cutting machine comprising in combination a material support, means to impart to and fro movements thereto along a substantially straight path, and means to cut the material in the direction of intersecting lines while said support is traveling in said path.

8. A cake cutting machine comprising in combination a reciprocatory material support, a plurality of cutters, and means to render the latter respectively effective to cut the material during opposite reciprocations of said support.

9. A cake cutting machine comprising in combination a material support, a traveling cutter, and a stationary cam to act upon said cutter and to render the latter effective for cutting.

10. A cake cutting machine comprising in combination a traveling material support, two sets of cutters, one stationary and the other traveling, and means to render the said cutters effective to act upon the material on said support.

11. A cake cutting machine comprising in combination a traveling material support, two sets of cutters positioned between the lateral edges of said support and operable for cutting while the said support is in motion, and means to cause one set of cutters to act upon the material in advance of the other.

12. A cake cutting machine comprising in combination a material support, a cutter, a cam, and means to impart relative movement between said cutter and cam to cause said cutter to be effective to cut the material.

13. A cake cutting machine comprising in combination a reciprocatory material support, cutters having a traveling movement therewith, and a stationary cam to act upon said cutters and impart cutting movement thereto while said support is in motion.

14. A cake cutting machine comprising in combination a reciprocatory bed, its presser, and a series of cutters reciprocable with said bed and means to impart inactive transverse movement of said cutters relative to said bed when the latter is traveling in one direction and effective transverse movement when said bed is traveling in an opposite direction.

15. A cake cutting machine comprising in combination a reciprocable bed and its presser, upper and under sets of knives normally ineffectively positioned, means to reciprocate said bed and presser past one of said sets of knives and simultaneously for moving the latter into effective cutting position, and means to reciprocate said bed and presser in an opposite direction and simultaneously to move said other set of knives into effective cutting position, each set of knives being in ineffective position while the other is effective.

16. A cake cutting machine comprising in combination a bed for the sheet of material to be cut, a presser substantially co-extensive in area with said bed, said presser and bed presenting one or more longitudinally extending and one or more transversely extending cutting slots respectively, through which the material held between said bed and presser may be cut along predetermined lines while held throughout between said bed and presser, one or more cutters ranging longitudinally of said bed, one or more cutters ranging transversely of said bed, and means to impart a relative reciprocation to said bed with its presser and said cutters, whereby during a complete reciprocation the material is cut into cakes without release of the material from between the presser and bed.

17. A cake cutting machine comprising in combination a bed for the material to be cut, a presser substantially co-extensive therewith, said bed and presser constituting holding members to hold the material to be cut substantially throughout its area, and a series of knives operable through one of said members and entering the other to cut material while so held.

18. A cake cutting machine comprising a bed, a presser movable toward and from the bed, cutters, means to impart relative cutting movement to the said bed and presser on the one hand and said cutters on the other, and means to adjust the level of said bed relative to said presser to accommodate material of different thicknesses.

19. A cake cutting machine comprising in combination a reciprocable bed, coöperating cutters, driving means and reversing mechanism therefor controlled by the travel of said bed, and means to enforce complete reciprocation of said bed in two directions when once it is set in motion.

20. The combination of the reciprocatory bed 40 and the presser having transverse and longitudinal slots respectively, lower and upper cutters 74 and 59 adapted during the reciprocation of said bed to penetrate the said slots of said bed and presser respectively, and means to operate said cutters.

21. A cake cutting machine comprising in combination superposed holding members to receive the material between them, one of said members being transversely slotted and the other member being longitudinally slotted, one or more transversely extending cutters operating through the first of said members and entering the other, and one or more longitudinally extending cutters operating through the last mentioned member and entering the first mentioned member, thereby to sever the material into cakes without releasing the material from between said members.

22. A cake cutting machine comprising in combination superposed holding members to receive the material between them, a plurality of cutters arranged in two sets, one set being positioned above the upper holding member and the other set being positioned below the lower holding member, said members being slotted for the passage of said cutters, and means to operate said cutters to cause each cutter to operate through the member adjacent thereto and to enter the other member.

23. A cake cutting machine comprising in combination opposed holding members, a plurality of cutters one operating through each of said members and entering the other, and means to impart relative traveling movement between the said holding members and the respective cutters while the latter are in operation.

24. A cake cutting machine comprising in combination superposed holding members to receive the material between them, a plurality of cutters arranged in two sets, one set being positioned above the upper holding member and the other set being positioned below the lower holding member, said members being slotted for the passage of said cutters, means to operate said cutters to cause each cutter to operate through the member adjacent thereto and to enter the other member, means to vary the separation of said holding members to accommodate materials of different thickness, and means thereby automatically to adjust said cutter.

25. The combination of a reciprocatory bed and a presser, one of said parts having transverse slots and the other of said parts having longitudinal slots, lower and upper cutters adapted during the reciprocation of said bed to penetrate the said slots of the bed and presser respectively, and means to operate said cutter.

26. A cake cutting machine comprising in combination opposed holding members, a cutter operating through one of said members and in coöperation with the other, means to vary the separation of said holding members to accommodate materials of different thickness, and means thereby automatically to adjust said cutter.

27. A cake cutting machine comprising in combination a reciprocable bed and its presser, means to adjust the level of said bed to accommodate materials of different thickness, a cutter operating through said presser and in conjunction with said bed, and means whereby adjustment of said bed causes automatic adjustment of said cutter relative to it.

28. A cake cutting machine comprising in combination a reciprocable bed and its presser, transversely operating cutters and means to cause travel thereof relative to said bed, a fulcrum shaft 72 on which said cutters are mounted, the bearing plates 70$^a$, and means to adjust the same.

29. A cake cutting machine comprising in combination opposed holding members, means to impart reciprocation to one at least of said members along a single path, one or more cutters operating through one of said members when traveling in one direction along said path, and one or more cutters operating through the other of said members when traveling in the other direction along said path.

30. A cake cutting machine comprising in combination a bed or support movable in opposite directions along a single path, one or more cutters operating through said bed or support when the latter is traveling in one direction along said path, and one or more cutters operating through said bed or support when the latter is traveling in the opposite direction along said path.

In testimony whereof, I have signed my name to this specification, in the presence of two subscribing witnesses.

EDWARD E. LAWRENCE

Witnesses:
ROBERT H. KAMMLER,
FREDERICK L. EMERY.